Patented Mar. 31, 1931

1,798,813

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO SCHERING-KAHLBAUM A.-G., OF BERLIN, GERMANY

PRODUCTION OF ISOALKYLENE PHENOLS

No Drawing. Application filed June 22, 1928, Serial No. 287,638, and in Germany July 14, 1927.

Our invention refers to the production of 3-methyl-6-isopropylenephenol and other isoalkylenephenols which serve as starting materials for odorants, disinfectants and other pharmaceutical products.

In the copending application for patent of the United States filed of even date herewith and entitled "A new condensation product from meta-cresol and acetone" Serial No. 287,639 a method of preparing 4,4'-dimethyl-2,2'-dihydroxydiphenyldimethylmethane by condensing meta-cresol and acetone at low temperature in the presence of a condensation agent is described.

We have now ascertained that this condensation product if heated to about 250° C. is decomposed into 3-methyl-6-isopropylenephenol and meta-cresol. The decomposition-products distill over in a quantitative manner and can be separated by fractional distillation. We prefer expediting the distilling of the decomposition-products from the material heated to about 250° C. by slight evacuation, the degree of the evacuation being chosen in such a manner that the original product does not distill over.

The decomposition of the 4,4'-dimethyl-2,2'-dihydroxydiphenyldimethylmethane can also be carried out in such a manner that the starting material is evaporated in vacuo at a comparatively low temperature, the heat required for decomposition being supplied to the vapor.

We have further found that the thermic decomposition is greatly facilitated by the presence of a surface catalyst. Such surface catalysts are for instance the products known as "Frankonite" and "Tonsil", which are magnesium-aluminum hydrosilicates commonly used as adsorbents, fuller's earth, Diatomite, silica gel, active carbon and similar porous bodies.

We have further found that also the thermic decomposition of other dihydroxy-diphenylmethane-derivatives can be greatly facilitated by the presence of a surface catalyst.

The thermic decomposition of these dihydroxydiphenylmethane derivatives takes place according to the following formula:

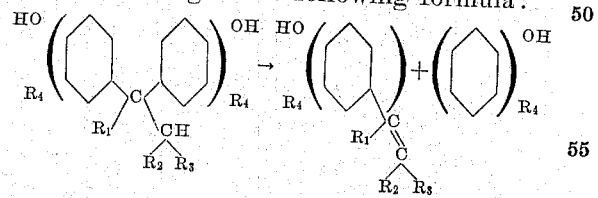

wherein $R_1$ $R_2$ $R_3$ and $R_4$ are each a hydrogen atom or a univalent alkyl or $R_1$ and $R_2$ together a bivalent alkylenradical, forming with the two adjacent carbon atoms a cyclic system, and wherein the two aryl nuclei also can have other substituents.

In carrying out the decomposition the starting material is heated in the presence of a surface catalyst to a temperature below the boiling point of the decomposition products, then the catalyst is filtered off and the decomposition products are separated by fractional distillation. The decomposition can also be carried out in the following manner. The starting material is heated in the presence of the surface catalyst over the boiling point of the decomposition-products, which distill over and can be separated by fractional distillation.

The decomposition can also be effected by melting the starting material in the presence of the catalyst under slight evacuation, the degree of the evacuation being chosen in such manner that the boiling point of the decomposition products is near the decomposition temperature and the molten material is not so much cooled by the distilling of the decomposition-products, that the decomposition process is interrupted.

The decomposition can also be carried through in such manner, that the starting material is evaporated in vacuo and the vapor is conducted across the heated surface catalyst.

Example 1

4,4'-dimethyl-2,2'-dihydroxy-diphenyldimethylmethane is heated in a retort to about 250° C. Meta-cresol and 3-methyl-6-isopropylenephenol distill off, which can be easily separated by fractional distillation.

Example 2

4,4'-dimethyl-2-2'-dihydroxydiphenyldimethylmethane in the presence of 2% of its weight of "Tonsil" is heated for a few hours to about 150° C. Then the catalyst is filtered off and the decomposition product is separated by fractional distillation. Meta-cresol and 3-methyl-6-isopropylenephenol is obtained.

Example 3

4,4'-dimethyl-2-2'-dihydroxydiphenyldimethylmethane is heated to about 130–150° C. in the presence of 1% of its weight of "Frankonite". A mixture of meta-cresol and 3-methyl-6-isopropylenephenol distills off, which can be separated by fractional distillation.

Example 4

4,4'-dihydroxydiphenyldimethylmethane is heated to about 200–230° C. in the presence of 3% of its weight of "Tonsil". A mixture of phenol and 4-isopropylenephenol distills off, which can be separated by fractional distillation.

Example 5

4,4-dihydroxydiphenylmethylethylmethane in vacuo (40 mm. mercury) is heated to about 220° C. in the presence of 1% of its weight of Frankonite. A mixture of phenol and 4-isobutenylphenol is obtained, which can be separated by fractional distillation, the 4-isobutenylphenol probably having the following formula:

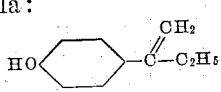

Various changes can be made in the details described in the foregoing specification without departing from the invention.

We claim:—

1. The method of preparing 3-methyl-6-isopropylenephenol comprising heating 4,4'-dimethyl-2,2'-dihydroxy-diphenyldimethylmethane above the melting point and separating the decomposition products by fractional distillation.

2. The method of preparing 3-methyl-6-isopropylenephenol comprising heating 4,4'-dimethyl-2,2'-dihydroxy-diphenyldimethylmethane above the melting point in the presence of contact masses having a high porosity and separating the decomposition products.

3. The method of preparing 3-methyl-6-isopropylenephenol comprising heating 4,4'-dimethyl-2,2'-dihydroxy-diphenyldimethylmethane in vacuo above the melting point and separating the decomposition products.

4. The method of preparing 3-methyl-6-isopropylenephenol comprising heating 4,4'-dimethyl-2,2'-dihydroxy-diphenyldimethylmethane in vacuo above the melting point in the presence of contact masses having a high porosity and separating the decomposition products.

5. The method of preparing isoalkylene phenols, including heating above their melting points dihydroxydiphenylalkylmethane compounds of the formula

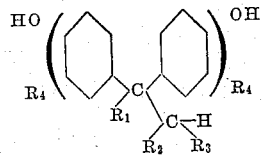

wherein $R_1$, $R_2$, $R_3$ and $R_4$ are each a hydrogen atom or a univalent alkyl radical, or $R_1$ and $R_2$ together are a bivalent alkylene radical, forming with two adjacent carbon atoms a cyclic system, and wherein the two aryl nuclei also can have other substituents, and separating the decomposition products by fractional distillation.

6. The method of preparing isoalkylene phenols, including heating above their melting points in the presence of contact masses of high porosity, dihydroxydiphenylalkylmethane compounds of the formula

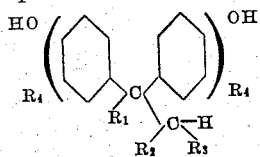

wherein $R_1$, $R_2$, $R_3$ and $R_4$ are each a hydrogen atom or a univalent alkyl radical, or $R_1$ and $R_2$ together are a bivalent alkylene radical, forming with two adjacent carbon atoms a cyclic system, and wherein the two aryl nuclei also can have other substituents, and separating the decomposition products.

7. The method of preparing isoalkylene phenols, including heating in vacuum, above their melting points dihydroxydiphenylalkylmethane compounds of the formula

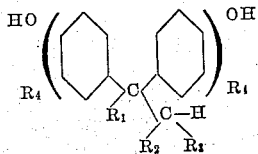

wherein $R_1$, $R_2$, $R_3$ and $R_4$ are each a hydrogen atom or a univalent alkyl radical, or $R_1$ and $R_2$ together are a bivalent alkylene radical, forming with two adjacent carbon atoms a cyclic system, and wherein the two aryl nuclei also can have other substituents, and separating the decomposition products.

8. The method of preparing isoalkylene phenols, including heating in vacuum, above their melting points in the presence of contact masses of high porosity, dihydroxy-diphenylalkylmethane compounds of the formula

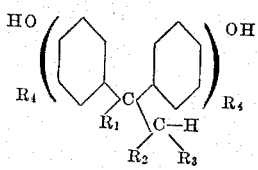

wherein $R_1$, $R_2$, $R_3$ and $R_4$ are each a hydrogen atom or a univalent alkyl radical, or $R_1$ and $R_2$ together are a bivalent alkylene radical, forming with two adjacent carbon atoms a cyclic system, and wherein the two aryl nuclei also can have other substituents, and separating the decomposition products.

WALTER SCHOELLER.
HANS JORDAN.
REINHARD CLERC.